(12) United States Patent  (10) Patent No.: US 10,346,673 B2
Aoki  (45) Date of Patent: Jul. 9, 2019

(54) BIOMETRIC AUTHENTICATION DEVICE, BIOMETRIC AUTHENTICATION METHOD, AND COMPUTER-READABLE NON-TRANSITORY MEDIUM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 15/432,986

(22) Filed: Feb. 15, 2017

(65) Prior Publication Data

US 2017/0262693 A1 Sep. 14, 2017

(30) Foreign Application Priority Data

Mar. 10, 2016 (JP) ................................ 2016-047496

(51) Int. Cl.
*G06K 9/00* (2006.01)
*G06K 9/20* (2006.01)

(52) U.S. Cl.
CPC ..... *G06K 9/00087* (2013.01); *G06K 9/00033* (2013.01); *G06K 9/00067* (2013.01); *G06K 9/2027* (2013.01); *G06K 2009/00932* (2013.01)

(58) Field of Classification Search
None
See application file for complete search history.

(56) References Cited

U.S. PATENT DOCUMENTS

2006/0290781 A1 12/2006 Hama
2008/0079842 A1 4/2008 Aoki et al.
2017/0251901 A1* 9/2017 Miyai ..................... A61B 1/04

FOREIGN PATENT DOCUMENTS

| EP | 1610268 A1 | 12/2005 |
|---|---|---|
| JP | 2007-010346 | 1/2007 |
| JP | 2007-086868 | 4/2007 |
| JP | 2008-090412 | 4/2008 |
| JP | 2014-078857 | 5/2014 |

OTHER PUBLICATIONS

Extended European Search Report dated Jul. 18, 2017 for corresponding European Patent Application No. 17157353.8, 10 pages.

* cited by examiner

*Primary Examiner* — Randolph I Chu
(74) *Attorney, Agent, or Firm* — Fujitsu Patent Center

(57) ABSTRACT

A biometric authentication device includes: a memory; and a processor coupled to the memory and the processor configured to execute a process, the process comprising: acquiring a plurality of sets of palm images taken under different illumination conditions of an illumination source from one another in obtaining images of a palm with light emitted from the illumination source; adjusting a time interval at which the imaging device acquires the image sets, in accordance with a condition for imaging the palm; extracting a biological feature from each of the image sets; and comparing each biological feature extracted by the extracting with a biological feature registered in advance.

20 Claims, 12 Drawing Sheets

APPROPRIATE HEIGHT

| AUTHENTICATION IMAGE SET 1 | AUTHENTICATION IMAGE SET 2 | AUTHENTICATION IMAGE SET 3 |

| ID | SENSOR TYPE | REGISTERED BIOLOGICAL FEATURE |
|---|---|---|
| 0001 | Type A | |
| 0002 | Type B | |
| 0003 | Type C | |

FIG. 7

| SENSOR TYPE | INTERVAL TIME [ms] |
|---|---|
| Type A | 0 |
| Type B | 50 |
| Type C | 300 |

FIG. 10A

| ID | INTERVAL TIME [ms] |
|---|---|
| 0001 | 80 |
| 0002 | 90 |
| 0003 | 150 |
| 0004 | 150 |

FIG. 10B

| ID | INTERVAL TIME [ms] |
|---|---|
| 0001 | 80 |
| 0002 (INTERNAL) | 90 |
| 0002 (EXTERNAL) | 70 |
| 0003 | 150 |
| 0004 | 150 |

BIOMETRIC AUTHENTICATION DEVICE, BIOMETRIC AUTHENTICATION METHOD, AND COMPUTER-READABLE NON-TRANSITORY MEDIUM

CROSS-REFERENCE TO RELATED APPLICATION

This application is based upon and claims the benefit of priority of the prior Japanese Patent Application No. 2016-047496, filed on Mar. 10, 2016, the entire contents of which are incorporated herein by reference.

FIELD

A certain aspect of embodiments described herein relates to a biometric authentication device, a biometric authentication method, and a computer-readable non-transitory medium.

BACKGROUND

A technology for increasing authentication accuracy in palm vein authentication has been disclosed. According to the technology, palm images are obtained while the illumination conditions of the illumination source are sequentially changed, and vein patterns are acquired from the palm images (see Patent Document 1, for example).

Patent Document 1: Japanese Laid-Open Patent Publication No. 2008-90412

SUMMARY

In palm vein authentication, non-contact authentication can be advantageously performed, but changes in posture tend to be large. To maintain a high authentication accuracy while allowing changes in posture, two or more palm images may be taken, and the similarity between the vein pattern obtained from each palm image and a registered template may be compared. Correct authentication can be performed if there is a preferable posture among the images of the palm in various postures.

In view of this, a vein pattern may be extracted from a set of palm images obtained while the illuminations conditions of the illumination source are sequentially changed. This process is repeated to extract vein patterns from two or more sets, and the similarity between the obtained vein patterns and a registered template may be compared. However, the memory capacity is limited. Therefore, there is a demand for efficient acquisition of images suitable for verification.

In recent years, the imaging rates of palm vein sensors have increased, and accordingly, a large number of images can be obtained in a short time. However, with a limited memory capacity, only images with small changes in posture can be obtained. Under such palm imaging conditions, the authentication accuracy becomes lower.

According to an aspect of the present invention, there is provided a biometric authentication device comprising: a memory; and a processor coupled to the memory and the processor configured to execute a process, the process comprising: acquiring a plurality of sets of palm images taken under different illumination conditions of an illumination source from one another in obtaining images of a palm with light emitted from the illumination source; adjusting a time interval at which the imaging device acquires the image sets, in accordance with a condition for imaging the palm; extracting a biological feature from each of the image sets; and comparing each biological feature extracted by the extracting with a biological feature registered in advance.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a diagram showing an example of a table stored in an interval table;

FIGS. 10A and 10B are diagrams showing examples of interval tables;

DESCRIPTION OF EMBODIMENTS

The following is a description of embodiments, with reference to the drawings.

First Embodiment

Figure 1A:
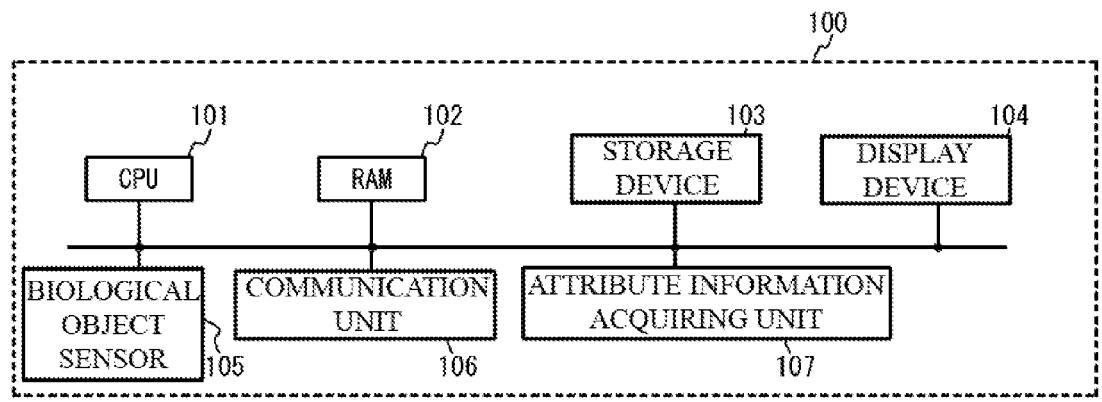
FIG. 1A is a block diagram for explaining the hardware configuration of a biometric authentication device according to a first embodiment.
Figure 1B:
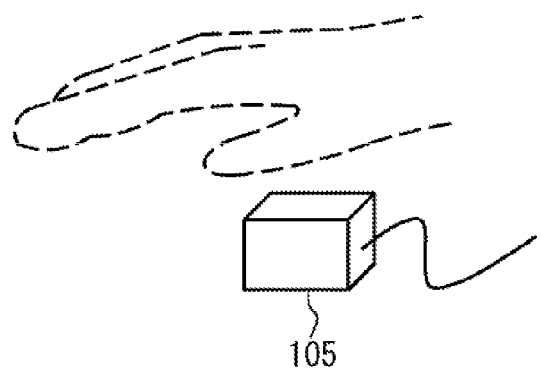
FIG. 1B is a schematic view of a biological object sensor.
Figure 1C:
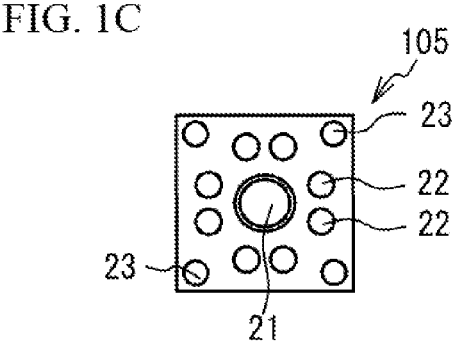
FIG. 1C is a top view of the biological object sensor.

FIG. 1A is a block diagram for explaining the hardware configuration of a biometric authentication device 100 according to a first embodiment. FIG. 1B is a schematic view of a biological object sensor 105, which will be described later. FIG. 1C is a top view of the biological object sensor 105. As shown in FIG. 1A, the biometric authentication device 100 includes a CPU 101, a RAM 102, a storage device 103, a display device 104, the biological object sensor 105, a communication unit 106, and an attribute information acquiring unit 107. These components are connected by a bus or the like.

The CPU (Central Processing Unit) 101 is a central processor. The CPU 101 includes one or more cores. The RAM (Random Access Memory) 102 is a volatile memory that temporarily stores a program to be executed by the CPU 101, data to be processed by the CPU 101, and the like.

The storage device 103 is a nonvolatile storage. For example, a read only memory (ROM), a solid-state drive (SSD) such as a flash memory, a hard disk to be driven by a hard disk drive, or the like can be used as the storage device 103. A biometric authentication program according to this embodiment is stored in the storage device 103. The display device 104 is a liquid crystal display, an electroluminescence panel, or the like, and displays the results of the later described processes and the like.

The biological object sensor 105 is a sensor that acquires biological information about a user, and acquires an image of the palm of the user's hand in a non-contact manner in this embodiment. As shown in the example in FIG. 1B, the biological object sensor 105 is a complementary metal oxide semiconductor (CMOS) camera, or the like. The biological object sensor 105 can acquire vascular patterns such as vein patterns in accordance with near infrared information. The biological object sensor 105 can also acquire the distance between the biological object sensor 105 and a biological object, in accordance with visible light or infrared information.

As shown in the example in FIG. 1C, the biological object sensor 105 includes a camera 21, illumination light sources 22, and spot light sources 23. The illumination light sources 22 are near infrared sources. The illumination light sources 22 are light sources each having a large irradiation angle, and emit light to an entire biological object. The illumination light sources 22 are arranged around the camera 21, for example. The spot light sources 23 are visible light sources. The spot light sources 23 are light sources each having a small irradiation angle. Therefore, the illumination areas of the spot light sources 23 on a biological object are at a distance from one another. That is, the spot light sources 23 emit spot light onto a biological object.

The communication unit 106 is a connection interface to a local area network (LAN), for example. The attribute information acquiring unit 107 is an input device such as a keyboard and a mouse, and is a device for inputting the ID, the username, the password, and the like for identifying the user, for example.

In some cases, an authentication image taken by irradiating a palm with near infrared rays (this image will be hereinafter referred to as an illumination-on image) is not enough to perform high-precision authentication. For example, in a case where there is external light such as sunlight, the use of an image taken where illumination is turned off (this image will be hereinafter referred to as an illumination-off image) might be effective. Specifically, external light can be cancelled by subtracting an illumination-off image from an illumination-on image. Here, the illumination-on image and the illumination-off image are preferably taken at the shortest possible time interval. This is because, if the object moves during the time between the illumination-on imaging and the illumination-off imaging, a correct subtraction cannot be calculated.

In other cases, an image taken by emitting spot light (this image will be hereinafter referred to as a spot-on image) is used to obtain information about the height and the tilt of the palm as the object. The height of the palm is the distance between the biological object sensor 105 and the palm. The tilt of the palm is the tilt angle of the palm with respect to the sensor surface of the biological object sensor 105. In an obtained image, the distance between the respective spots of light varies with the height of the palm. Therefore, the height of the palm can be obtained by acquiring the distance between the respective spots of light. Also, the tilt of the palm can be obtained by acquiring the heights of respective positions of the palm. To use a spot image in a stable manner in the presence of external light, an off image for spot light (a spot-off image) is used in some cases.

Figure 2:
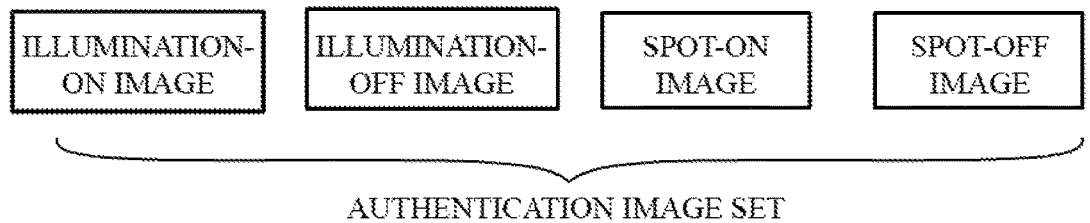
FIG. 2 is a diagram showing an example of an authentication image set.

To perform high-precision authentication, several types of images (images with different illumination distribution profiles, "on" images, and "off" images) under different illumination conditions as described above may be used. Hereinafter, the images of different types necessary for one authentication process will be referred as an "authentication image set". As shown in FIG. 2, an illumination-on image, an illumination-off image, a spot-on image, and a spot-off image are used as an authentication image set, for example.

Figure 3:
FIG. 3 is a diagram showing an example of successive imaging.
Figure 3:
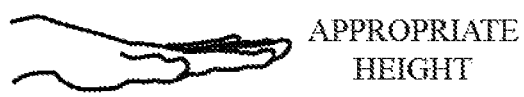
Figure 3:

Since the object to be authenticated in biometric authentication is a biological object, there may be a change in posture (a change in the distance to the camera or a change in the tilt of the object) and a change in shape (movement of the palm closing or opening) at any time. Both changes are collectively referred to as changes in the object. As a method for increasing authentication accuracy in spite of various changes, FIG. 3 shows an example of use of images that are successively taken for authentication. In the example shown in FIG. 3, three authentication image sets 1 through 3 are successively taken, and the degrees of similarity between biological features extracted from the respective authentication image sets and a biological feature registered in advance are calculated. Of these degrees of similarity, the highest one is employed. During the successive imaging, the posture of the palm changes. In the example shown in FIG. 3, the height of the palm changes. If one of the three authentication image sets includes an image of a preferred posture, correct authentication can be performed. In the example shown in FIG. 3, in a case where the palm is located close to the position in which the palm was located when the registered biological feature was created, the corresponding image is selected as an image of a preferred posture.

In some cases, the number of authentication image sets that can be successively taken is limited by a processing speed, a memory capacity, or the like. In a case where images are to be stored in a memory in the biological object sensor 105, for example, the upper limit of the number of sets is determined by the capacity of the memory installed in the biological object sensor 105. Images may be stored not in the biological object sensor 105 but in a personal computer connected to the biological object sensor 105. Where a personal computer is used, a large capacity of memory can be used, and a large number of images can be stored, accordingly. In such a case, however, the imaging rate might change depending on the USB or network environment or the like that connects the biological object sensor 105 and the personal computer. Therefore, it becomes difficult to guarantee a constant level of authentication accuracy.

In a case where the authentication image sets are stored in a memory in the biological object sensor 105, on the other hand, a constant imaging rate is guaranteed, which is desirable in terms of authentication accuracy. However, the number of authentication image sets that can be taken is limited. In such a case, it is preferable to use the largest number of images that can be taken.

As described above, the effect to increase authentication accuracy can be achieved through successive imaging. Meanwhile, the number of authentication image sets that can be taken in a unit time (this number will be hereinafter referred to as the imaging rate) varies depending on the type of the biological object sensor 105. Specifically, the number is determined by 1) the imaging rate of the installed imaging element, 2) the light quantity of the LED (if the LED is dark, a long exposure time is required), and the like.

An imaging rate is not set for each individual sensor in conventional cases. The imaging rate of a sensor of an older model is normally low, and such a sensor constantly performs imaging at the maximum rate. However, thanks to the recent development in technology, even a small-sized sensor can image data at a high speed. As a result, the imaging rate needs to be adjusted to an optimum imaging rate.

Where the imaging rate is higher, an illumination-on image and an illumination-off image can be taken at a shorter time interval, and the influence of external light and hand movement can be reduced, accordingly. If the imaging rate is too high, however, the effect of successive imaging might be lost. This is because, if the imaging rate is too high, images of an object in almost the same postures are taken. In the example shown in FIG. 3, images of an object at three different heights are taken. However, if the imaging rate is too high, images of the object at almost the same heights are taken. A sensor of a new model normally has a high imaging rate (thanks to the higher performance of the components). Because of this, if a broken sensor is replaced with a sensor of a new model, the imaging rate switches from the conventional imaging rate to a higher imaging rate, resulting in decreases in user-friendliness and authentication accuracy.

In view of this, the interval time between the acquisition of an authentication image set and the acquisition of another authentication image set is changed in accordance with the type of the biological object sensor in this embodiment. Here, the interval time means the time in which any image acquisition is not performed. As the interval time is set, the time interval between each two sets in acquiring authentication image sets is determined.

Figure 4A:
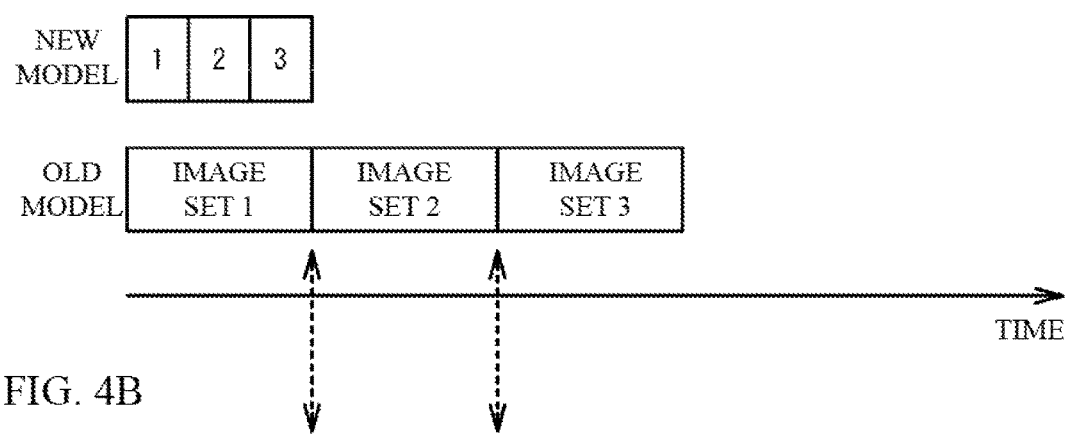
FIG. 4A is a diagram showing examples of imaging rates of different sensor types.

FIG. 4A is a diagram showing examples of imaging rates of different types of sensors. As shown in FIG. 4A, a high imaging rate cannot be achieved with a biological object sensor of an old model, for example. Therefore, the time interval between the acquisition of an authentication image set and the acquisition of the next authentication image set is long. On the other hand, the imaging rate of a biological object sensor of a new model is expected to be high. In this case, the time interval between the acquisition of an authentication image set and the acquisition of the next authentication image set is short. Therefore, a high authentication accuracy might not be achieved in comparing a biological feature extracted by the biological object sensor of the new model with a registered biological feature extracted by the biological object sensor of the old model.

Figure 4B:
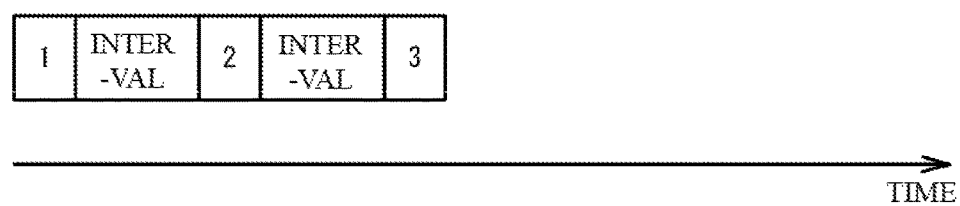
FIG. 4B is a diagram showing an example of setting of an interval time.

To counter this, an interval time is set as shown in FIG. 4B, so that the time interval between the acquisition of an authentication image set and the acquisition of the next authentication image set can be the same or similar between the biological object sensor of the old model and the biological object sensor of the new model. Thus, a high authentication accuracy can be achieved. It should be noted that the influence of external light and hand movement can be reduced by shortening the time required for acquiring an authentication image set.

Next, a specific configuration is described. The biometric authentication program stored in the storage device 103 is loaded into the RAM 102 so that the program can be executed. The CPU 101 executes the biometric authentication program loaded into the RAM 102. Thus, respective processes are carried out by the biometric authentication device 100. As the biometric authentication program is executed, a registration process, an authentication process, and the like are carried out.

Figure 5:
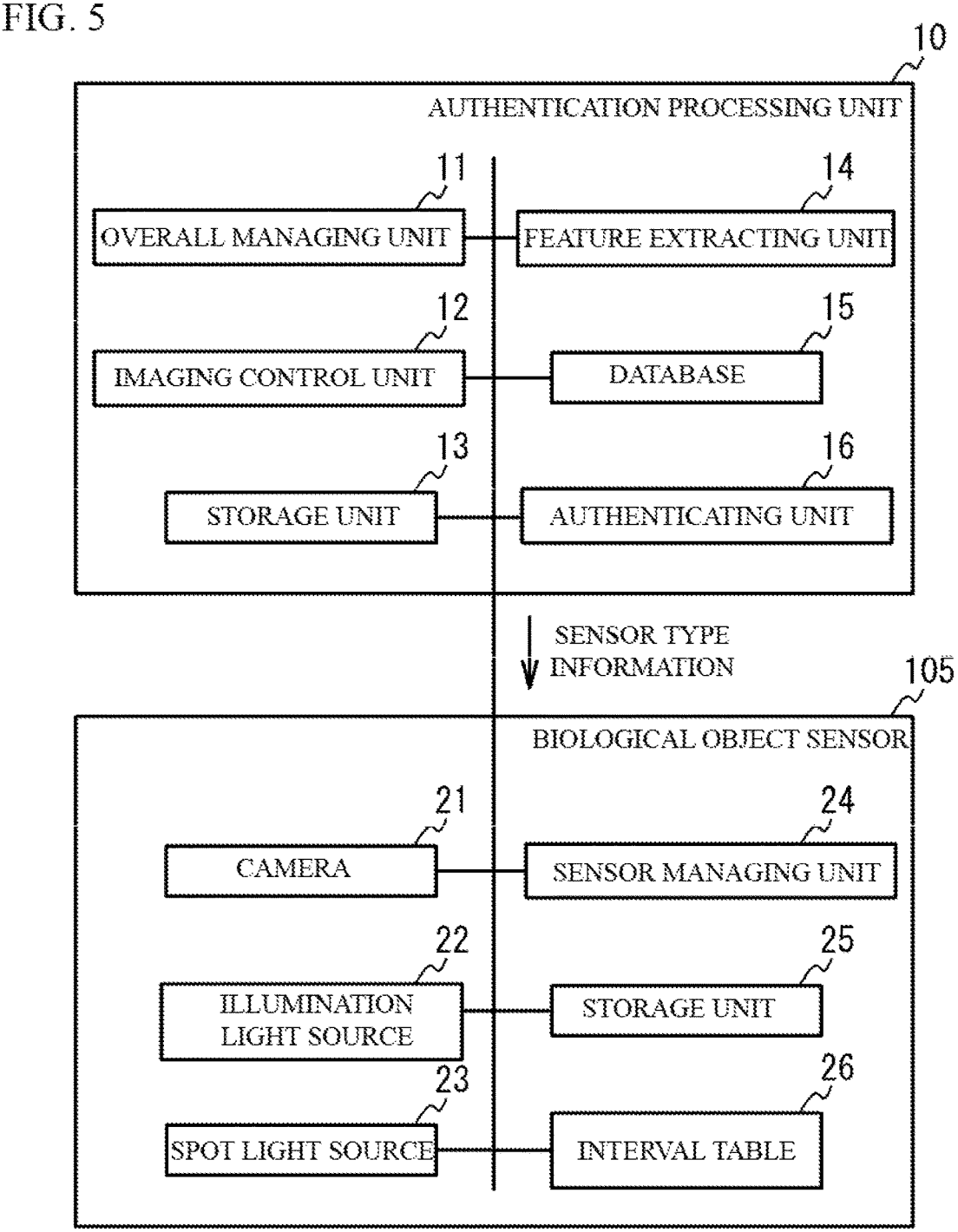
FIG. 5 is a block diagram showing the respective functions to be achieved through execution of a biometric authentication program.

FIG. 5 is a block diagram showing the respective functions to be achieved through the execution of the biometric authentication program. As shown in FIG. 5, an authentication processing unit 10 is obtained through the execution of the biometric authentication program. The authentication processing unit 10 functions as an overall managing unit 11, an imaging control unit 12, a storage unit 13, a feature extracting unit 14, a database 15, an authenticating unit 16, and the like.

Figures 6A, 6B:
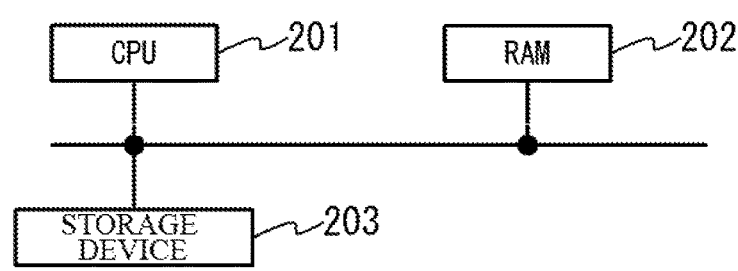
FIG. 6A is a diagram showing an example of a table stored in a database.
FIG. 6B is a diagram showing part of the hardware configuration in the biological object sensor.

The overall managing unit 11 controls the respective components. The imaging control unit 12 controls the imaging performed by the biological object sensor 105. Specifically, the imaging control unit 12 controls the illuminating timings of the illumination light sources 22 and the spot light sources 23, and the imaging timings of the camera 21. The storage unit 13 functions as a buffer for authentication image sets acquired from the biological object sensor 105. The feature extracting unit 14 extracts verification biological features from the respective authentication image sets stored in the storage unit 13. In this embodiment, the feature extracting unit 14 extracts vein patterns as verification biological features from illumination-on images and illumination-off images. The database 15 stores the attribution information about respective users, registered biological features, and the types of the biological object sensors that have obtained the registered biological features. In the database 15, the attribute information, the registered biological features, and the types of the biological object sensors are associated with one another in advance. FIG. 6A shows an example of a table stored in the database 15.

The authenticating unit 16 compares biological features extracted by the feature extracting unit 14 with the registered biological features stored in the database 15, and causes the display device 104 to display the results. For example, if the degree of similarity between a verification biological feature extracted by the feature extracting unit 14 and a registered biological feature stored in the database 15 is equal to or higher than a threshold value, the authenticating unit 16 causes the display device 104 to display information indicating successful authentication. At the time of comparing, the authenticating unit 16 may correct a verification biological feature extracted by the feature extracting unit 14, using a spot-on image and a spot-off image. For example, the authenticating unit 16 may correct the magnification of a verification biological feature, using distance information obtained from a spot-on image and a spot-off image.

The biological object sensor 105 has the functions of a sensor managing unit 24, a storage unit 25, an interval table 26, and the like, as well as the camera 21, the illumination light sources 22, and the spot light sources 23. FIG. 6B is a diagram showing an example of part of the hardware configuration in the biological object sensor 105. As shown in FIG. 6B, the biological object sensor 105 includes a CPU 201, a RAM 202, and a storage device 203. These components are connected to one another by a bus or the like. The CPU 201 is a central processor. The RAM 202 is a volatile memory that temporarily stores the program to be executed by the CPU 201, the data to be processed by the CPU 201, and the like. The storage device 203 is a nonvolatile storage. As a program stored in the storage device 203 is executed by the CPU 201, the functions of the sensor managing unit 24, the storage unit 25, the interval table 26, and the like are achieved.

The sensor managing unit 24 controls the respective components of the biological object sensor 105. For example, in accordance with an instruction from the imaging control unit 12, the sensor managing unit 24 controls the on-off timings of the illumination light sources 22 and the spot light sources 23, and the imaging timings of the camera 21. The storage unit 25 stores the authentication image sets obtained through the imaging performed by the camera 21. The interval table 26 stores the interval times of respective sensors. FIG. 7 shows an example of the table stored in the interval table 26. As shown in FIG. 7, the sensor types of biological object sensors 105 are associated with intervals (ms), and the sensor types and the intervals are stored therein.

A specific example of the setting of an interval time is now described. The time required for a first sensor of an old type (a sensor with a low imaging rate) to acquire an authentication image set is represented by T1 (msec). The time required for a second sensor of a new type (a sensor with a high imaging rate) to acquire an authentication image set is represented by T2 (msec). The first sensor is used in extracting registered biological features, and the second sensor is used in authentication processes. In this case, an interval time is set in the second sensor so that authentication image sets can be acquired with the second sensor at the same time intervals as those with the first sensor. Specifically, $\Delta 12 = T1 - T2$ (msec) is set as the interval time.

Figure 8:
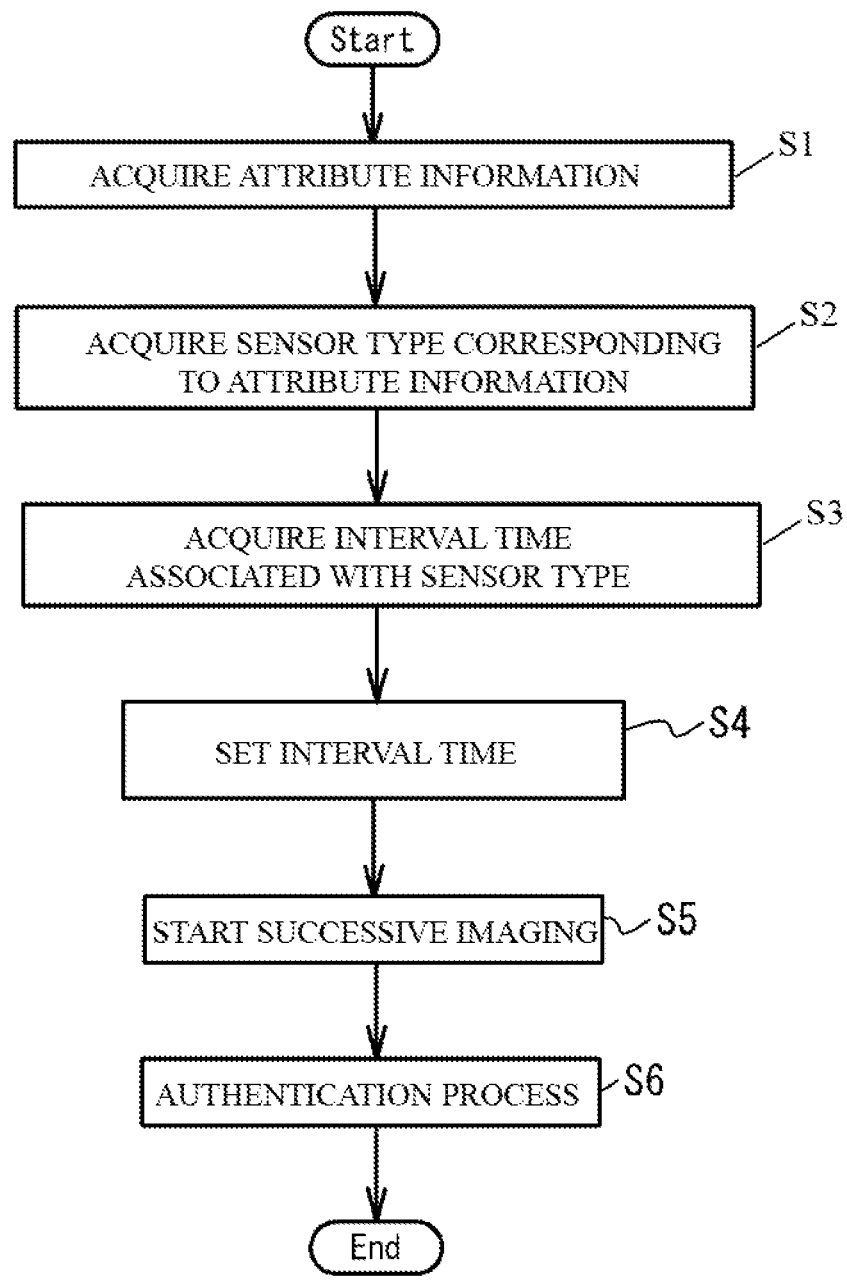
FIG. 8 is an example of a flowchart showing an authentication process according to this embodiment in detail.

FIG. 8 is an example of a flowchart showing an authentication process according to this embodiment in detail. As shown in the example in FIG. 8, the attribute information acquiring unit 107 acquires the ID of a user as attribute information, for example (step S1). The overall managing unit 11 then refers to the database 15, and acquires the sensor type corresponding to the ID acquired in step S1 (step S2). The sensor type acquired in step S2 is transmitted to the sensor managing unit 24 of the biological object sensor 105 via the imaging control unit 12.

The sensor managing unit 24 then refers to the interval table 26, and acquires the interval time associated with the sensor type (step S3). The sensor managing unit 24 then sets the interval time acquired in step S3 as the interval time between authentication image sets (step S4). In accordance with the interval time set in step S4, the sensor managing unit 24 performs successive imaging of authentication image sets (step S5). The authenticating unit 16 then performs authentication, using the authentication image sets obtained in step S5 (step S6).

Information "sensor type B" may be transmitted in step S2, for example. In the example shown in FIG. 7, 50 msec, which is associated with sensor type B, is set as the interval time. Through this operation, the same successive imaging rate as that of the sensor B can be achieved.

According to this embodiment, even in a case where imaging conditions are changed as different sensors are used in the registration of a biological feature and in the authentication process, the difference in the time interval at which authentication image sets are acquired can be made smaller. Thus, images necessary for verification can be efficiently acquired in accordance with imaging conditions. As the difference in the time interval at which authentication image sets are acquired becomes smaller, the imaging rate in extracting the registered biological feature and the imaging rate in extracting the verification biological feature becomes closer to each other. Thus, the conditions in which biological features are extracted become similar, and accordingly, a high authentication accuracy can be achieved.

Although the configuration for transmitting a sensor type to the biological object sensor 105 has been described in this embodiment, the present invention is not limited to that. For example, an interval time may be transmitted to the biological object sensor 105. Also, an interval time may be set directly as a "time". The number of frames (imaging frames of the imaging element) may be designated, and the data equivalent to the designated number of frames may be skipped.

Second Embodiment

The imaging rate is determined to be too high or is determined to be too low, in accordance with the movement speed of the object to be imaged. For example, in the example shown in FIG. 3, an appropriate imaging rate is determined in accordance with the speed at which the hand is lowered. The optimum value of the imaging rate also varies with users and scenes of usage. Even the same user moves a hand at different speeds depending on scenes of usage and sensor installation conditions. In such a case, appropriate imaging rates for the respective scenes of usage are set so that the authentication accuracy is increased. The second embodiment concerns an example where an interval time is set in accordance with the user and the scene of usage.

Figure 9:
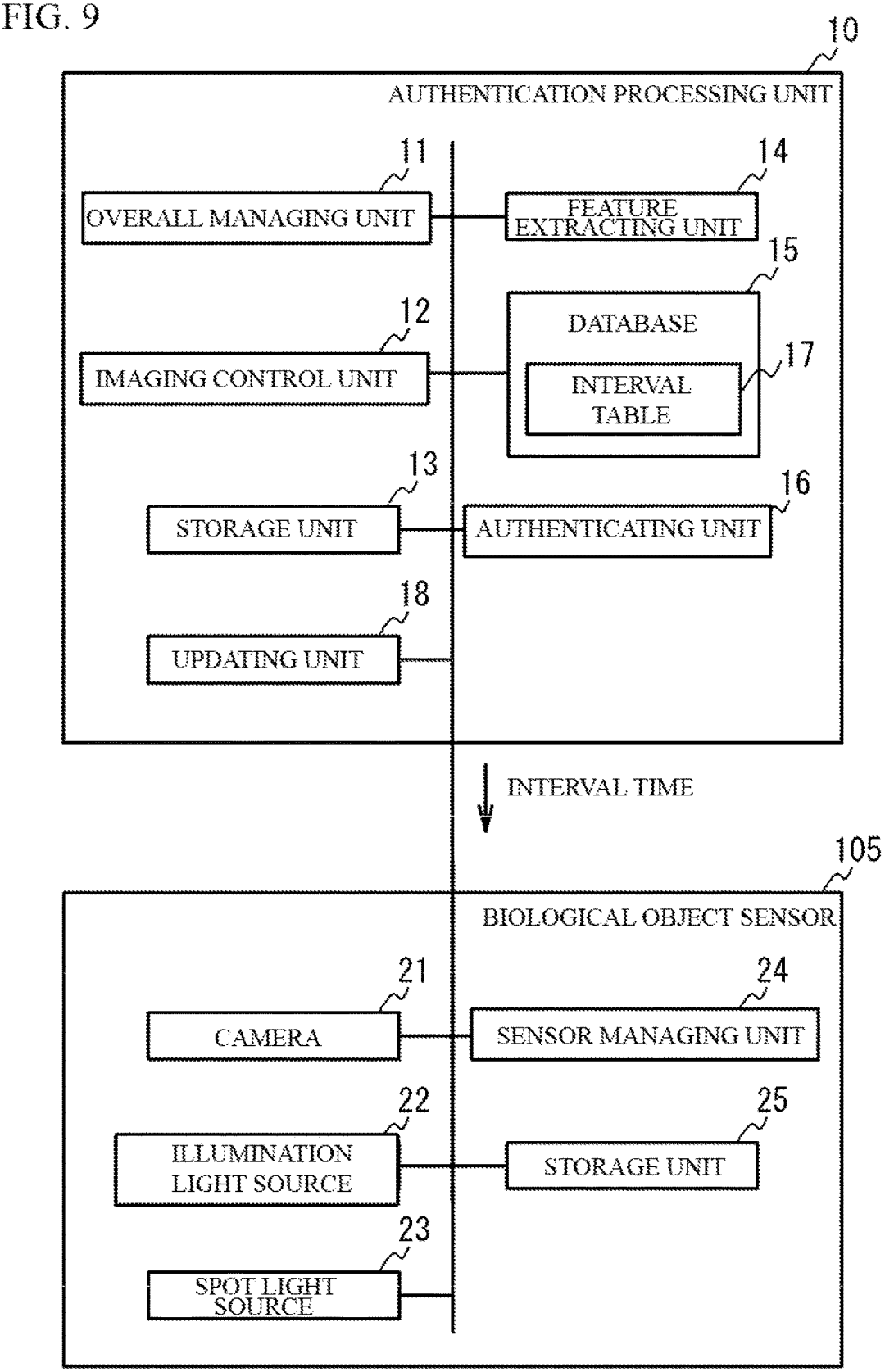
FIG. 9 is a functional block diagram according to a second embodiment.

FIG. 9 is a functional block diagram according to this embodiment. The differences from the first embodiment lie in that the biological object sensor 105 does not include the interval table 26 but the database 15 includes an interval table 17, and an updating unit 18 is further provided. As shown in the example shown in FIG. 10A, interval times associated with respective IDs are stored in the interval table 17. It should be noted that an initial interval time can be determined beforehand through an experiment or the like.

Figure 11:
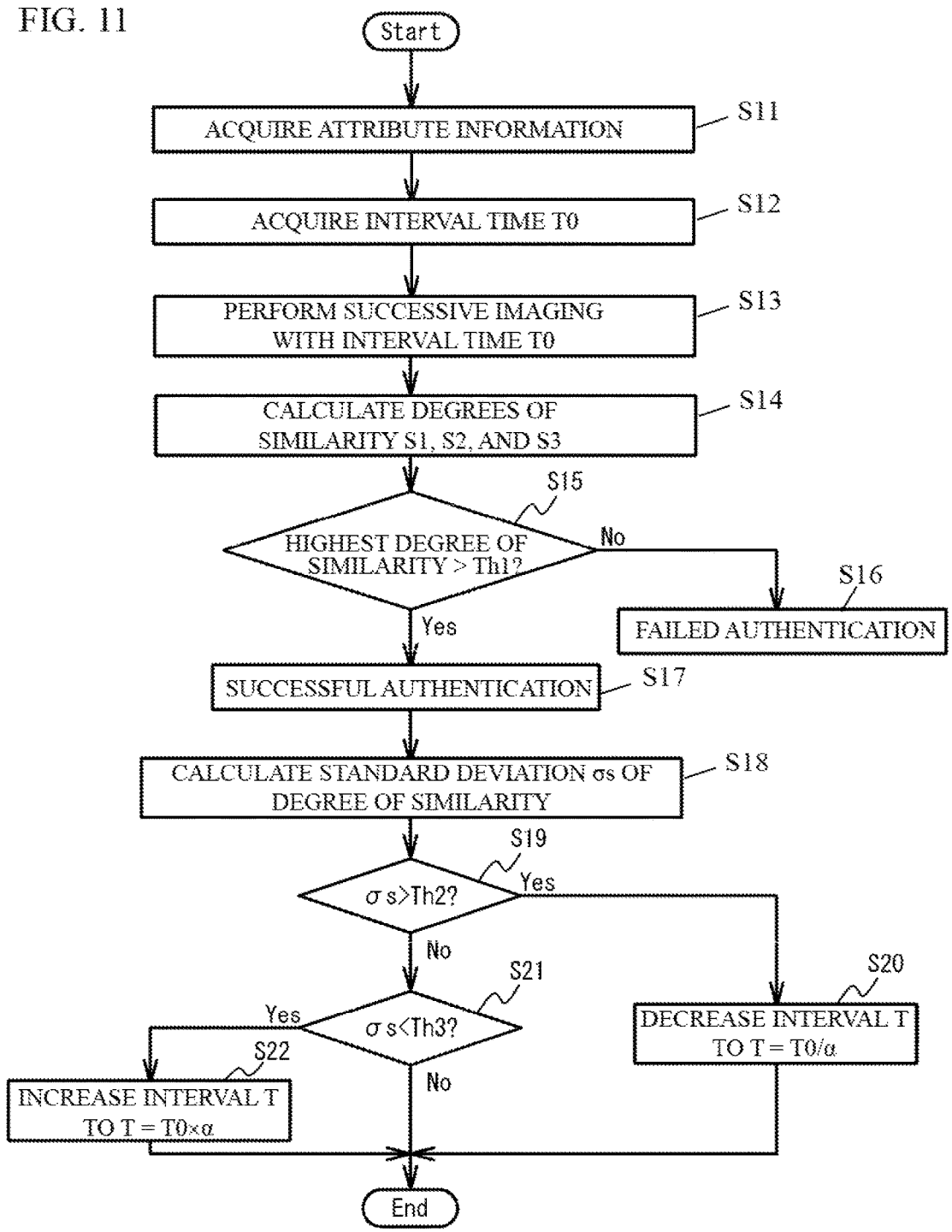
FIG. 11 is an example of a flowchart showing an authentication process according to the second embodiment in detail.

FIG. 11 is an example of a flowchart showing an authentication process according to this embodiment in detail. As shown in the example in FIG. 11, the attribute information acquiring unit 107 acquires the ID of a user as attribute information, for example (step S11). The overall managing unit 11 then refers to the interval table 17, and acquires the interval time T0 associated with the ID acquired in step S11 (step S12). The interval time T0 acquired in step S12 is transmitted to the sensor managing unit 24 of the biological object sensor 105 via the imaging control unit 12.

The sensor managing unit 24 then sets the interval time T0 as the interval time between authentication image sets, and, in accordance with the interval time T0, performs successive imaging to obtain authentication image sets (step S13). In this embodiment, three authentication image sets are successively obtained. The authenticating unit 16 then calculates the degrees of similarity S1, S2, and S3 between biological features extracted from the respective authentication image sets and the registered biological feature corresponding to the ID acquired in step S1 (step S14).

The authenticating unit 16 then determines whether the largest value among the degrees of similarity calculated in step S14 exceeds a threshold value Th1 (step S15). If the result of the determination in step S15 is "No", the authenticating unit 16 causes the display device 104 to display information indicating failed authentication (step s16). If the result of the determination in step S15 is "Yes", the authenticating unit 16 causes the display device 104 to display information indicating successful authentication (step S17). The updating unit 18 then calculates the standard deviation σs of the degrees of similarity S1, S2, and S3 (step S18).

The updating unit 18 then determines whether the standard deviation as exceeds a threshold value Th2 (step S19). If the result of the determination in step S19 is "Yes", the updating unit 18 updates the interval time T0 to T=T0/α (step S20). Here, α is a greater value than 1, and is a parameter for controlling the learning speed. The execution of the process shown in the flowchart then comes to an end. If the result of the determination in step S19 is "No", the updating unit 18 determines whether the standard deviation as is smaller than a threshold value Th3 (<Th2) (step S21). If the result of the determination in step S21 is "Yes", the interval time T0 is updated to T=T0×α (step S22). The execution of the process shown in the flowchart then comes to an end. If the result of the determination in step S21 is "No", the execution of the process shown in the flowchart then comes to an end. It should be noted that the value of α may differ between step S20 and step S22.

Where the differences among the degrees of similarity S1 through S3 are large, the standard deviation as is large. In such a case, the imaging time intervals are probably too long. Therefore, the interval time is shortened as in step S20, so that the variation among the degrees of similarity S1 through S3 can be adjusted to an appropriate value. As a result, the authentication accuracy can be increased. Where the differences among the degrees of similarity S1 through S3 are small, on the other hand, the standard deviation as is small. In such a case, the imaging time intervals are probably too short. Therefore, the interval time is made longer as in step S22, so that the variation among the degrees of similarity S1 through S3 can be adjusted to an appropriate value. As a result, the authentication accuracy can be increased. Instead of the degrees of similarity S1 through S3, it is possible to use degrees of similarity S1', S2', and S3' between verification biological features obtained from the respective authentication image sets.

Alternatively, it is possible to use variation in distance between the biological object sensor 105 and the palm, instead of the degrees of similarly. A distance between the biological object sensor 105 and the palm can be calculated from a spot-on image and a spot-off image. Where distances between the biological object sensor 105 and the palm are represented by D1, D2, and D3, the same process as that with the above described degrees of similarity is carried out on measured values of the distances, and the interval time is updated. For example, the distances D1, D2, and D3 are the mean values of distances between the biological object sensor 105 and the palm, the distances being calculated from distances between the respective spots of light.

Figure 12:
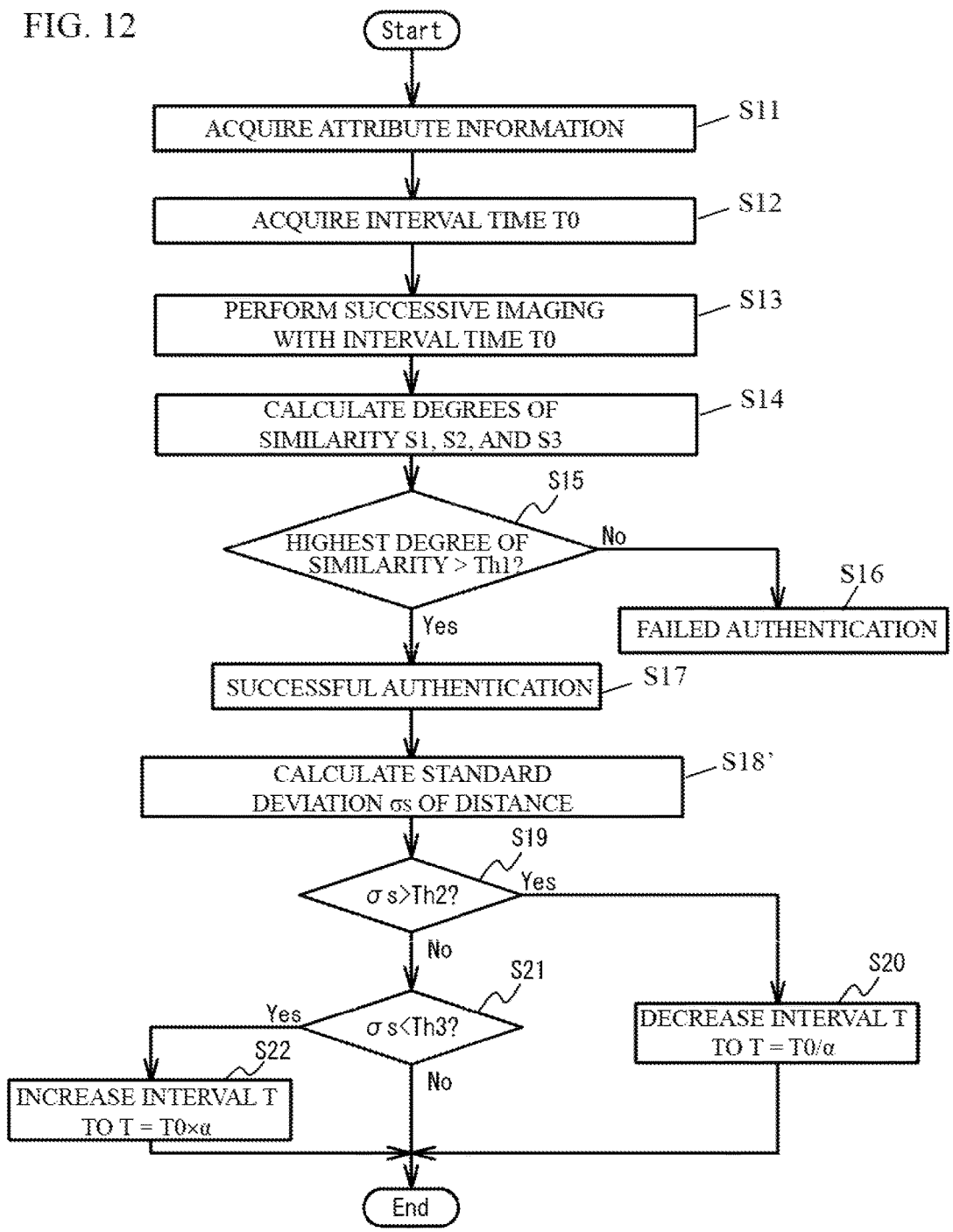
FIG. 12 is an example of a flowchart showing in detail an authentication process in which an interval time is updated in accordance with a distance.

FIG. 12 is an example of a flowchart specifically showing an authentication process for updating the interval time with the use of the distances D1 through D3. As shown in the example in FIG. 12, step S18' is carried out, instead of step S18. In step S18', the standard deviation σs of the distances D1 through D3 is calculated. Where the differences among the distances D1 through D3 are large, the standard deviation σs is large. In such a case, the imaging time intervals are probably too long. Therefore, the interval time is shortened as in step S20, so that the variation among the distances D1 through D3 can be adjusted to an appropriate value. As a result, the authentication accuracy can be increased. Where the differences among the distances D1 through D3 are small, on the other hand, the standard deviation σs is small. In such a case, the imaging time intervals are probably too short. Therefore, the interval time is made longer as in step S22, so that the variation among the distances D1 through D3 can be adjusted to an appropriate value. As a result, the authentication accuracy can be increased.

Interval times may be set in accordance with places of use of the biometric authentication device 100, as well as with the IDs of users. FIG. 10B shows another example of a table stored in the interval table 17. In the example shown in FIG. 10B, an internal interval time and an external interval time are set for the user with the ID "0002". That is, interval times for respective places are set. For example, when authentication is required outside the office, the matter at hand may be an urgent matter. For example, when a quotation is urgently requested by a client, there is a need to log on the in-house computer system from outside. Therefore, the motion of the hands outside the office might be faster. To counter this, imaging rates are set separately for external cases and internal cases so that the authentication accuracy can be increased. Specifically, each matter can be determined to be an external matter or can be determined to be an internal matter, in accordance with the connected network. The interval time may be switched between the internal interval time and the external interval time, in accordance with the information obtained as above.

According to this embodiment, even in a case where the imaging conditions are changed as the users to be compared are changed, an interval time suitable for each user is set. Thus, the necessary images for comparing can be efficiently acquired in accordance with the imaging conditions. Since the same user tends to move a palm at similar speeds, the variation in movement of the palm within a time interval at which respective authentication image sets are acquired is reduced. Thus, a high authentication accuracy is achieved. Furthermore, as interval times are set in accordance with users' places of use, interval times can be set in a meticulous manner. Thus, the authentication accuracy can be further increased. Also, the interval time is updated in accordance with a result of verification, a distance to the palm, or the like. Thus, the interval time can be changed to an appropriate value.

Although each of the above described examples involves a stand-alone terminal, the present invention is not limited to that. For example, this embodiment can be applied to a client server system.

In each of the above described embodiments, authentication image sets are acquired while illumination intensities are sequentially switched among an illumination-on state, an illumination-off state, a spot-on state, and a spot-off state, for example. However, the present invention is not limited to that. For example, the vein pattern of the entire palm may be acquired with near infrared rays, and the shape of the entire palm may be acquired with visible light. In this case, the illumination intensity may not be changed. As visible light and near infrared rays are used in this case, authentication image sets are acquired while the wavelength of the illumination is sequentially changed. Each of the above described embodiments can also be applied in such a case. Further, authentication image sets may be acquired while the illumination angle is sequentially changed, and different kinds of biological images are obtained. In such a case, the authentication image sets are acquired while the irradiation angle of illumination is sequentially changed. Each of the above described embodiments can also be applied in such a case. Although near infrared rays and visible light are used together in the above described embodiments, illumination-on images and illumination-off images formed only with near infrared rays may be used, for example. As described above, each of the above described embodiments can be applied in cases where authentication image sets are acquired while the illumination conditions are sequentially changed.

In each of the above described embodiments, the camera 21 functions as an example of an imaging device that acquires sets of palm images formed under different illumination conditions of an illumination source from one another in obtaining images of a palm illuminated with light from the illumination source. The imaging control unit 12 functions as an example of an adjusting unit that adjusts the time intervals at which the imaging device acquires image sets, in accordance with a condition for imaging the palm. The feature extracting unit 14 functions as an example of an extracting unit that extracts biological features from the respective image sets. The authenticating unit 16 functions as an example of a comparing unit that compares the respective biological features extracted by the extracting unit with registered biological features that are registered in advance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric authentication device comprising:
   an illumination source configured to emit a light to a palm;
   a camera configured to take a plurality of image sets of palm images under different illumination conditions of the illumination source from one another in obtaining images of the palm with light emitted from the illumination source;
   a memory; and
   a processor coupled to the memory and the processor configured to execute a process, the process comprising:
   adjusting a time interval at which the imaging device acquires the image sets, in accordance with a condition for imaging the palm;
   extracting a biological feature from each of the image sets;
   comparing each biological feature extracted by the extracting with a biological feature registered in advance; and
   outputting information of success of authentication when each similarity degree of the each biological feature extracted by the extracting and the biological feature registered in advance is a threshold or more.

2. The biometric authentication device as claimed in claim 1, wherein the imaging condition is a condition depending on a type of an imaging device used in creating the registered biological feature.

3. The biometric authentication device as claimed in claim 1, wherein the imaging condition is a condition depending on an object to be subjected to the comparing.

4. The biometric authentication device as claimed in claim 1, wherein the illumination conditions are illumination intensities of the illumination source.

5. The biometric authentication device as claimed in claim 1, wherein the process further comprises:
   updating the time interval, in accordance with variation in degree of similarity between each biological feature extracted by the extracting and the registered biological feature.

6. The biometric authentication device as claimed in claim 1, wherein the process further comprises:
   updating the time interval, in accordance with position variation of the palm, the position variation being obtained from the image sets.

7. The biometric authentication device as claimed in claim 1, wherein the imaging device includes a memory storing the image sets.

8. A biometric authentication method comprising:
   emitting a light to a palm from an illumination source;
   by using a camera, taking a plurality of image sets of palm images under different illumination conditions of the illumination source from one another in obtaining images of the palm with light emitted from the illumination source;
   adjusting a time interval at which the imaging device acquires the image sets, in accordance with a condition for imaging the palm;
   extracting a biological feature from each of the image sets;
   comparing each biological feature extracted by the extracting unit with a biological feature registered in advance; and
   outputting information of success of authentication when each similarity degree of the each biological feature extracted by the extracting and the biological feature registered in advance is a threshold or more.

9. The biometric authentication method as claimed in claim 8, wherein the imaging condition is a condition depending on a type of an imaging device used in creating the registered biological feature.

10. The biometric authentication method as claimed in claim 8, wherein the imaging condition is a condition depending on an object to be subjected to the comparing.

11. The biometric authentication method as claimed in claim 8, wherein the illumination conditions are illumination intensities of the illumination source.

12. The biometric authentication method as claimed in claim 8, wherein the process further comprises:
    updating the time interval, in accordance with variation in degree of similarity between each biological feature extracted by the extracting and the registered biological feature.

13. The biometric authentication method as claimed in claim 8, further comprising
    updating the time interval, in accordance with position variation of the palm, the position variation being obtained from the image sets.

14. The biometric authentication method as claimed in claim 8, wherein the imaging device includes a memory storing the image sets.

15. A computer readable, non-transitory medium storing a program that causes a computer to execute a process, the process comprising:
    emitting a light to a palm from an illumination source;
    by using a camera, taking a plurality of image sets of palm images under different illumination conditions of the illumination source from one another in obtaining images of the palm with light emitted from the illumination source;
    adjusting a time interval at which the image sets are acquired, in accordance with a condition for imaging the palm;

extracting a biological feature from each of the image sets;

comparing each extracted biological feature with a biological feature registered in advance; and outputting information of success of authentication when each similarity degree of the each biological feature extracted by the extracting and the biological feature registered in advance is a threshold or more.

16. The medium as claimed in claim 15, wherein the imaging condition is a condition depending on a type of an imaging device used in creating the registered biological feature.

17. The medium as claimed in claim 15, wherein the imaging condition is a condition depending on an object to be subjected to the comparing.

18. The medium as claimed in claim 15, wherein the illumination conditions are illumination intensities of the illumination source.

19. The medium as claimed in claim 15, wherein the process further comprises:

updating the time interval, in accordance with variation in degree of similarity between each biological feature extracted by the extracting and the registered biological feature.

20. The medium as claimed in claim 15, wherein the process further comprises:

updating the time interval, in accordance with position variation of the palm, the position variation being obtained from the image sets.

* * * * *